(12) United States Patent
Park et al.

(10) Patent No.: US 6,419,252 B1
(45) Date of Patent: Jul. 16, 2002

(54) TRAVELING AND ACCELERATING SYSTEM FOR RIDING A BICYCLE FORWARD REGARDLESS THE ROTATION DIRECTION OF THE PEDALS

(75) Inventors: Jong-il Park; Yun-rak Lee, both of Seoul (KR)

(73) Assignee: Jung-II Park, Seoul (KR)

( * ) Notice: Subject to any disclaimer, the term of this patent is extended or adjusted under 35 U.S.C. 154(b) by 0 days.

(21) Appl. No.: 09/623,892

(22) PCT Filed: Mar. 11, 1999

(86) PCT No.: PCT/KR99/00112

§ 371 (c)(1),
(2), (4) Date: Nov. 7, 2000

(87) PCT Pub. No.: WO99/46160

PCT Pub. Date: Sep. 16, 1999

(30) Foreign Application Priority Data

Mar. 11, 1998 (KR) ............................................. 98-8152
Mar. 10, 1999 (KR) ............................................. 99-7919

(51) Int. Cl.[7] ............................................. B62M 11/14
(52) U.S. Cl. ...................... 280/237; 280/260; 280/238; 280/261; 74/594.2; 475/12; 475/294
(58) Field of Search ............................... 280/236, 237, 280/260, 238, 259, 261; 74/594.1, 594.2, 594.3, 606 R; 475/12, 13, 294, 296, 297, 324, 331

(56) References Cited

U.S. PATENT DOCUMENTS

| | | | | |
|---|---|---|---|---|
| 5,435,583 A | * | 7/1995 | Foster, Jr. ..................... | 280/237 |
| 5,647,817 A | * | 7/1997 | Chang ......................... | 475/294 |
| 5,765,847 A | * | 6/1998 | Toronto et al. .............. | 280/237 |
| 5,884,927 A | * | 3/1999 | Mahaney et al. ............ | 280/237 |
| 5,895,336 A | * | 4/1999 | Yoo .......................... | 280/238 X |
| 5,918,894 A | * | 7/1999 | Toronto et al. .............. | 280/237 |
| 5,957,802 A | * | 9/1999 | Yoo ........................... | 475/294 |
| 5,971,884 A | * | 10/1999 | Yoo ........................ | 475/297 X |
| 6,045,475 A | * | 4/2000 | Yoo ........................ | 475/296 X |

FOREIGN PATENT DOCUMENTS

| | | | |
|---|---|---|---|
| EP | 687622 A1 | * | 12/1995 |
| GB | 2263511 A | * | 7/1993 |
| KR | 9513589 | * | 11/1995 |
| WO | WO98/29297 | * | 7/1998 |

* cited by examiner

*Primary Examiner*—J. J. Swann
*Assistant Examiner*—F. Zeender

(57) ABSTRACT

A traveling and accelerating system for bicycles includes a frame having a front wheel at a front part and a rear wheel at a rear part thereof; a pair of pedals fixed at both sides of a shaft which is rotatably supported at a boss being fixed under a center of the frame, to be driven by a user's feet; a driving sprocket axially fixed on the shaft for transmitting rotation power via a chain to the rear wheel; a housing attached at one side of the boss to be closed with a cap and having a hollow cross-sectional shape to accommodate accessories; a pinion axially fixed on the shaft beside the driving sprocket in the housing; a first gear member accommodated in the housing and having an inner gear part along its inner diameter; a second gear member movably contacting the first gear member and provided with planetary gears to be engaged with the inner gear part of the first gear, the planetary gears being fixed by pins and rotatable in relation to the pins; a pair of latch means respectively inserted and fixed in the first gear member and the second gear member by being penetrated with a shaft of the pedals so as to rotate the gear members respectively in one direction; and a conversion control part connected to a release cable outside the housing for setting a travel mode or an acceleration mode corresponding to rotation directions of the pedals by controlling engagement of the first gear member and the second gear member according to the user's selection.

7 Claims, 8 Drawing Sheets

TRAVELING AND ACCELERATING SYSTEM FOR RIDING A BICYCLE FORWARD REGARDLESS THE ROTATION DIRECTION OF THE PEDALS

BACKGROUND OF THE INVENTION

1. Field of the Invention

The present invention relates to a traveling and accelerating system for bicycles, and more particularly to, an improved traveling and accelerating system for bicycles by which the bicycle may travel forward regardless of rotation direction of pedals and accelerated travel is also possible without changing gears.

2. Description of the Prior Art

In general, bicycles include front and rear wheels, pedals to generate power by being stepped by a user, and a power transmission means to transfer the power generated by rotation of the pedals to the rear wheel.

The power transmission means includes a driving sprocket mounted at the pedals, a driven sprocket having a latch for transmitting power toward the rear wheel in one direction, and a chain to connect the driving sprocket to the driven sprocket.

The driven sprocket is provided with a latch member to be engaged with the rear wheel only in one direction.

As described above, the conventional bicycle travels only in one direction, that is, in the forward direction by rotation power which is generated by rotating the pedals forward and transmitted through the chain connecting the driving sprocket to the driven sprocket.

Therefore, the user has to rotate the pedals only in the forward direction, and such a same movement makes the user's leg-muscles unbalanced and makes the user feel bored and tired easily, while it is impossible to relieve his fatigue while riding the bicycle.

In the conventional traveling device, even though it is possible to stop rotation of the pedals or rotate the driving sprocket and the chain reversely in response to reverse rotation of the pedals, the power is cut off and not transmitted by a forward latch means provided inside the driven sprocket so that the driven sprocket races.

In order to resolve the above disadvantages, Korean Patent Publication No. 95-13589 has suggested a reverse traveling device which includes a forward clutch to alternatively transmit driving power to a driving sprocket, a feed shaft of which engagement state is changeable by means of an operation lever, an idle gear and a reversing gear wheel, so that the bicycle may travel forward even in case of backward rotation of the pedals, developing the user's feet and legs in balance.

The reverse traveling device has, however, still problems that the structure thereof is too complicated and this reverse traveling device cannot be adapted to the driving wheel at the driven sprocket side of the currently widespread bicycles, so that a new bicycle should be purchased.

Furthermore, such a proposed reverse traveling device has no change gear, so that there is a tendency to avoid use of it.

SUMMARY OF THE INVENTION

Accordingly, it is an object of the present invention to provide a traveling and accelerating system for bicycles which may transmit power in case of not only forward rotation but also backward rotation of pedals.

It is another object of the present invention to provide a traveling and accelerating system for bicycles which may operate in both forward and backward directions of pedal rotation so that users may develop their leg-muscles in balance without feeling as bored and tired as riding the prior art bicycle.

It is a further object of the present invention to provide a traveling and accelerating system for bicycles which is provided with a change gear integrally for accelerated traveling so that an additional change gear is not necessary any more and users may purchase a bicycle at a relatively low cost.

To achieve the above objects, the present invention is directed to a traveling and accelerating system for bicycles which includes a frame having a front wheel at a front part and a rear wheel at a rear part thereof; a pair of pedals fixed at both sides of a shaft which is rotatably supported at a boss being fixed under a center of the frame, to be driven by a user's feet; a driving sprocket axially fixed on the shaft for transmitting rotation power via a chain to the rear wheel; a housing attached at one side of the boss to be closed with a cap and having a hollow cross-sectional shape to accommodate accessories; a pinion axially fixed on the shaft beside the driving sprocket in the housing; a first gear member accommodated in the housing and having an inner gear part along its inner diameter; a second gear member movably contacting the first gear member and provided with planetary gears to be engaged with the inner gear part of the first gear, the planetary gears being fixed by pins and rotatable in relation to the pins; a pair of latch means respectively inserted and fixed in the first gear member and the second gear member by being penetrated with a shaft of the pedals so as to rotate the gear members respectively in one direction; and a conversion control part connected to a release cable outside the housing for setting a travel mode or an acceleration mode corresponding to rotation directions of the pedals by controlling engagement of the first gear member and the second gear member according to the user's selection.

According to the traveling and accelerating system for bicycles of the present invention, the user may simply change the pedals' rotation direction forward and backward by operating the conversion lever while keeping forward traveling of the bicycle, thereby promoting balanced development of leg-muscles.

Also, it becomes possible to selectively accelerate traveling speed by increasing rotation number with relation to a certain rotation.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

FIG. 1 to FIG. 8 show a construction of a traveling and accelerating system for bicycles according to an embodiment of the present invention, in which clutch bearings are adapted as forward and backward latch means.

Figure 1:
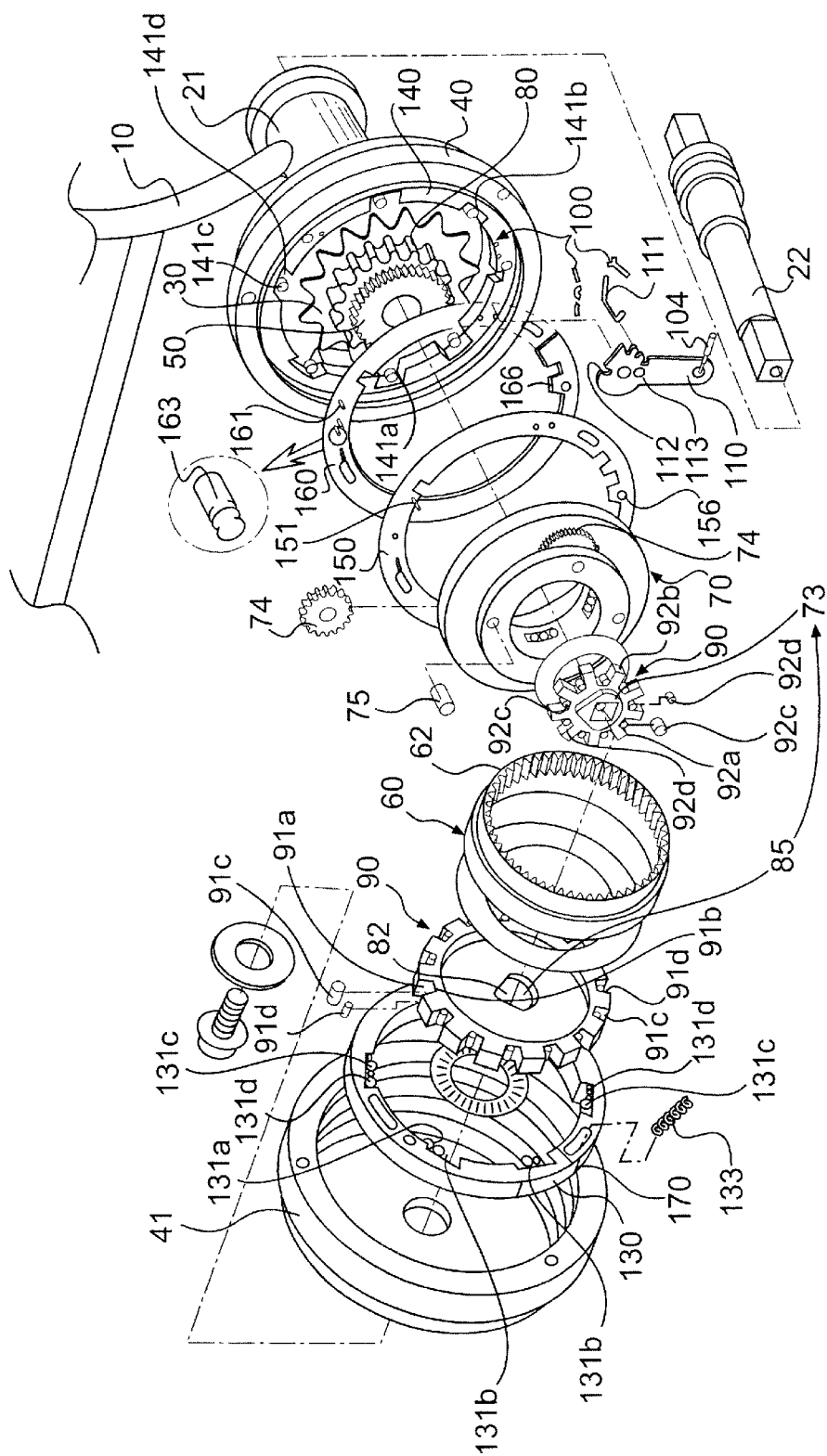
FIG. 1 is a disassembled perspective view showing the construction of principal parts of a traveling and accelerating system for bicycles according to the present invention.
Figure 2:
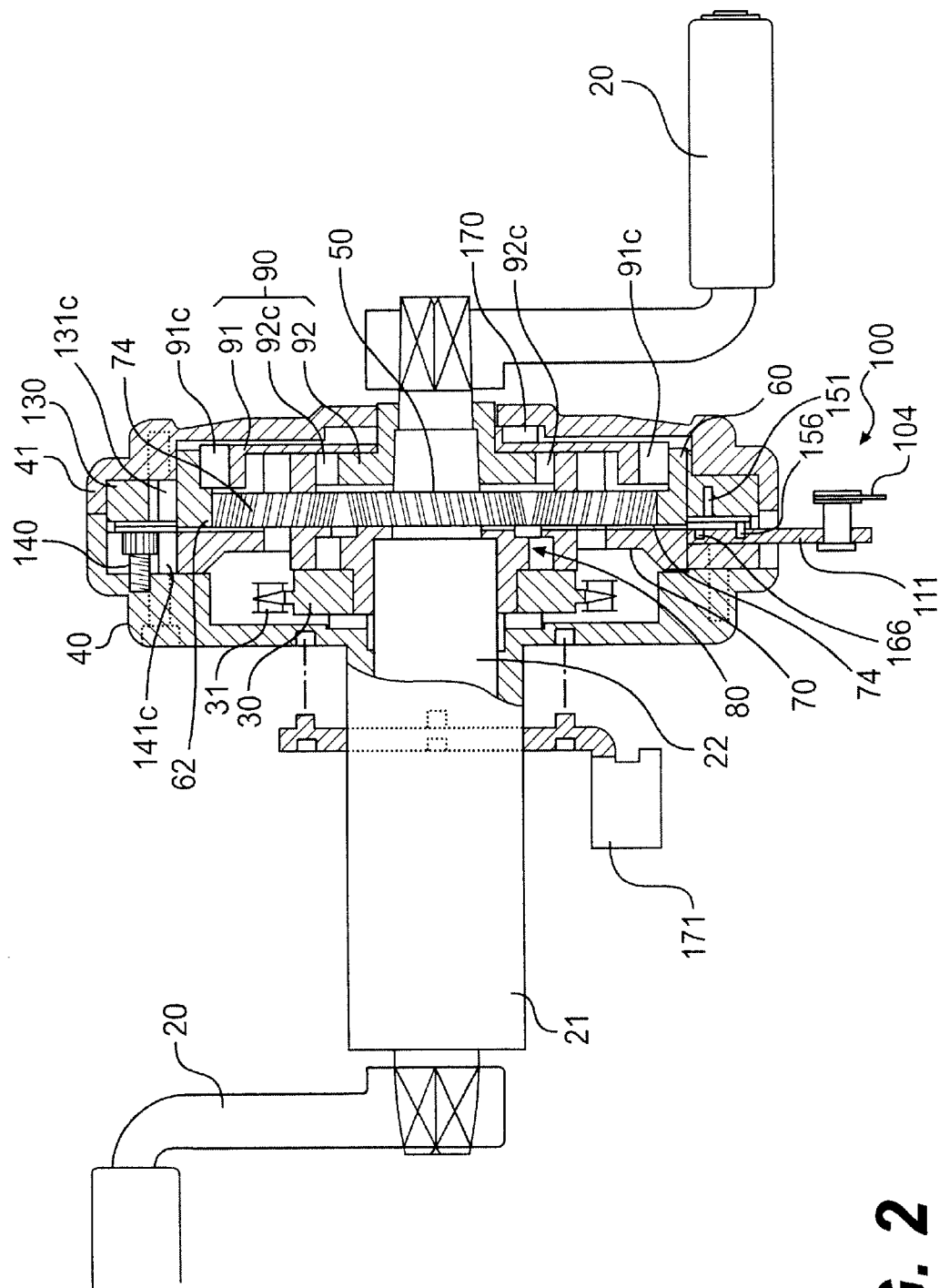
FIG. 2 is a partially taken unfolded view showing the construction of the traveling and accelerating system for bicycles according to the present invention, which is in an assembled state.

FIG. 1 is a disassembled perspective view showing the construction of principal parts of a traveling and accelerating system for bicycles according to the present invention, and FIG. 2 is a partially taken unfolded view showing the construction of the traveling and accelerating system for bicycles according to the present invention, which is in an assembled state.

Figure 3:
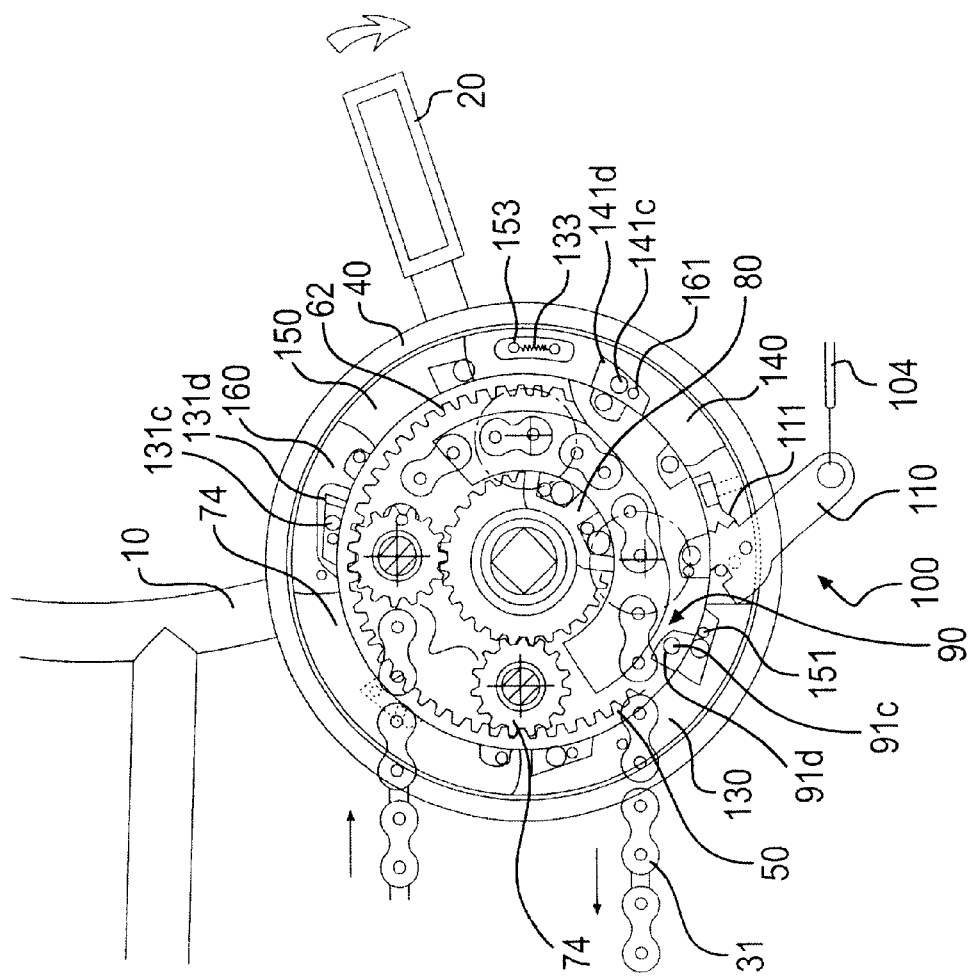
FIG. 3 is a partially taken unfolded operational view for explaining forward normal travel mode in case of stepping pedals forward.
Figure 4:
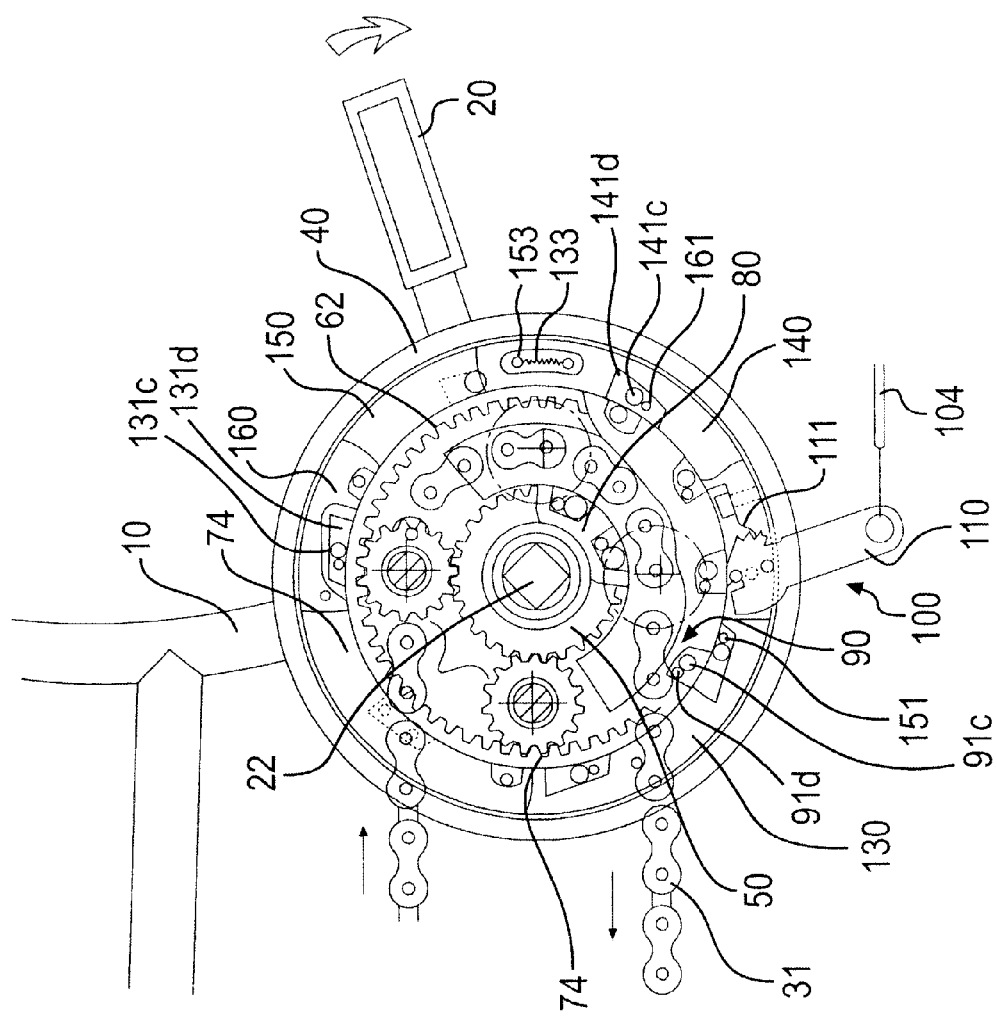
FIG. 4 is a partially taken unfolded operational view for explaining accelerated travel mode in case of stepping pedals forward.
Figure 5:
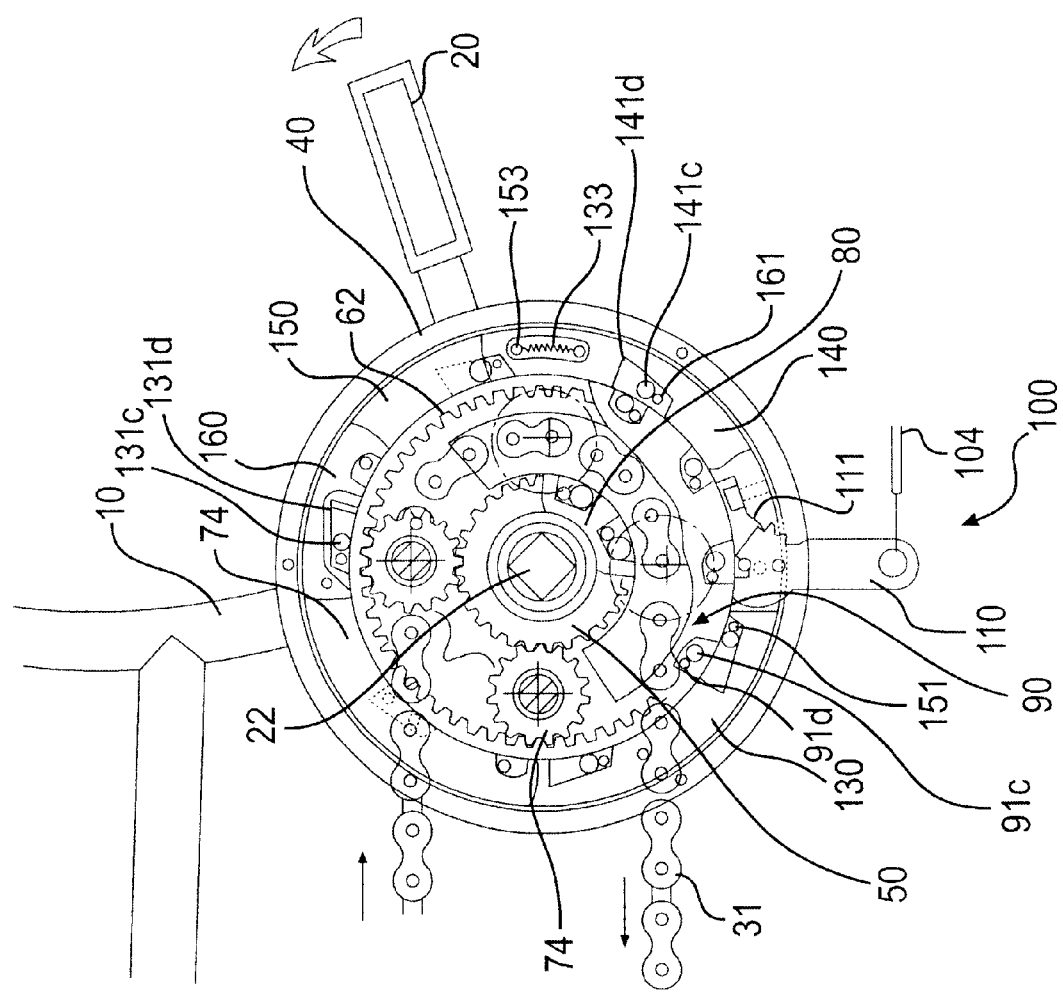
FIG. 5 is a partially taken unfolded operational view for explaining forward accelerated travel mode in case of stepping pedals backward.

FIG. 3 is a partially taken unfolded operational view for explaining forward normal travel mode according to a selection of a conversion control part 100, FIG. 4 is a partially taken unfolded operational view for explaining accelerated travel mode by a selection of the conversion control part 100, and FIG. 5 is a partially taken unfolded operational view for explaining forward accelerated travel mode in case of stepping pedals 20 backward by a selection of the conversion control part 100.

Figure 6:
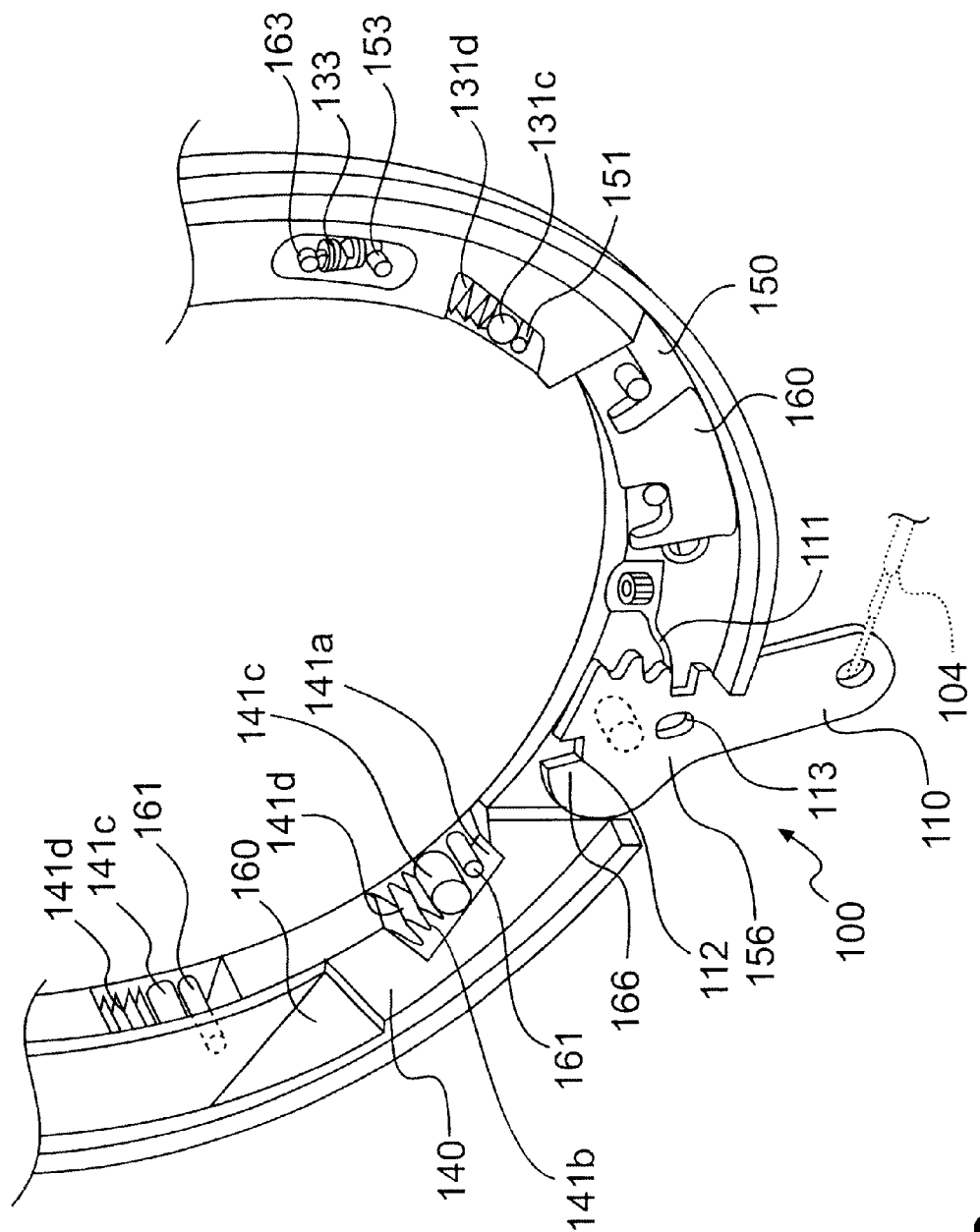
FIG. 6 is a perspective view showing the construction of principal parts of a traveling and accelerating system for bicycles according to the present invention, in which a conversion control part is set to a forward normal travel mode.
Figure 7:
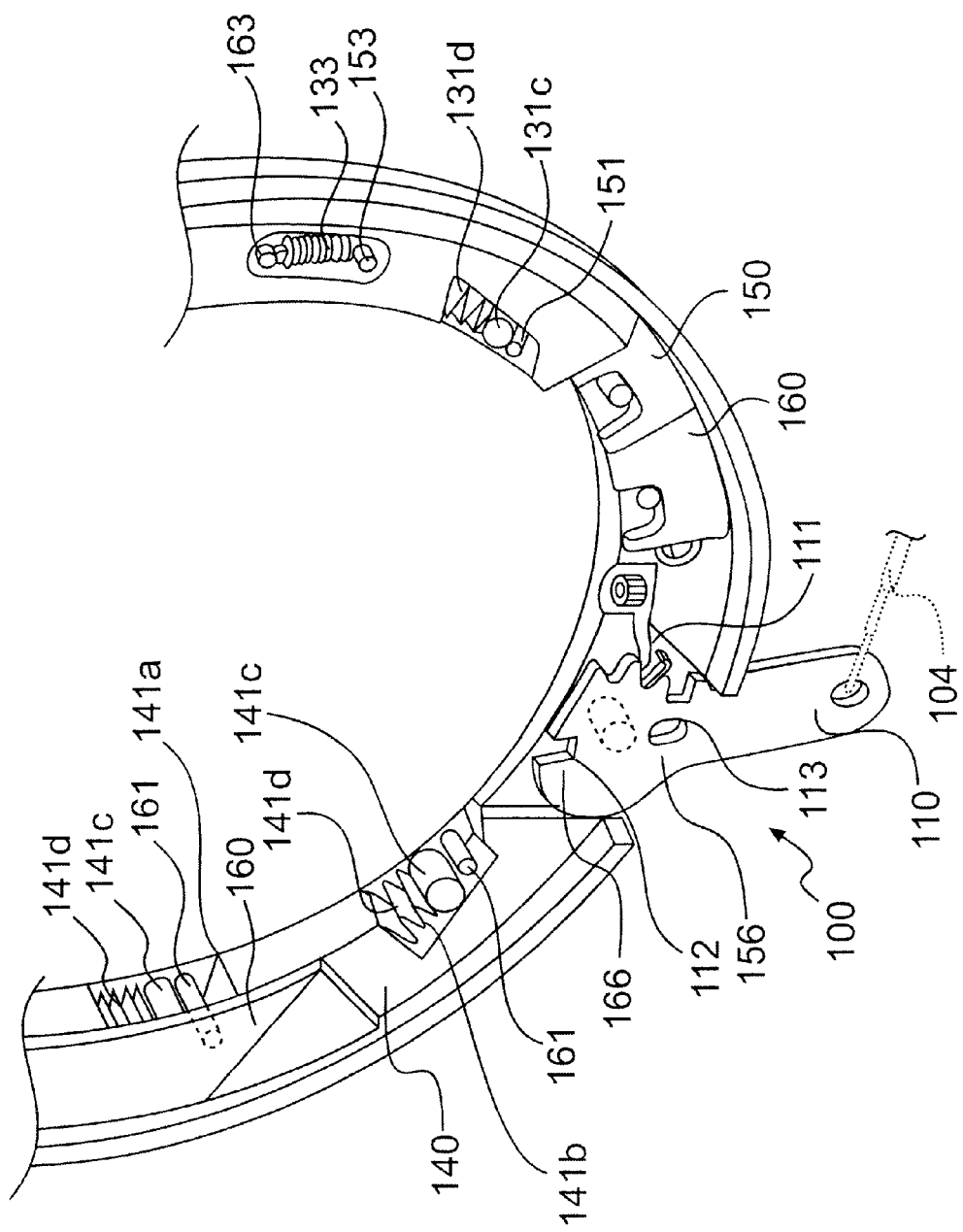
FIG. 7 is a perspective view showing the construction of principal parts of a traveling and accelerating system for bicycles according to the present invention, in which a conversion control part is set to a forward accelerated travel mode.
Figure 8:
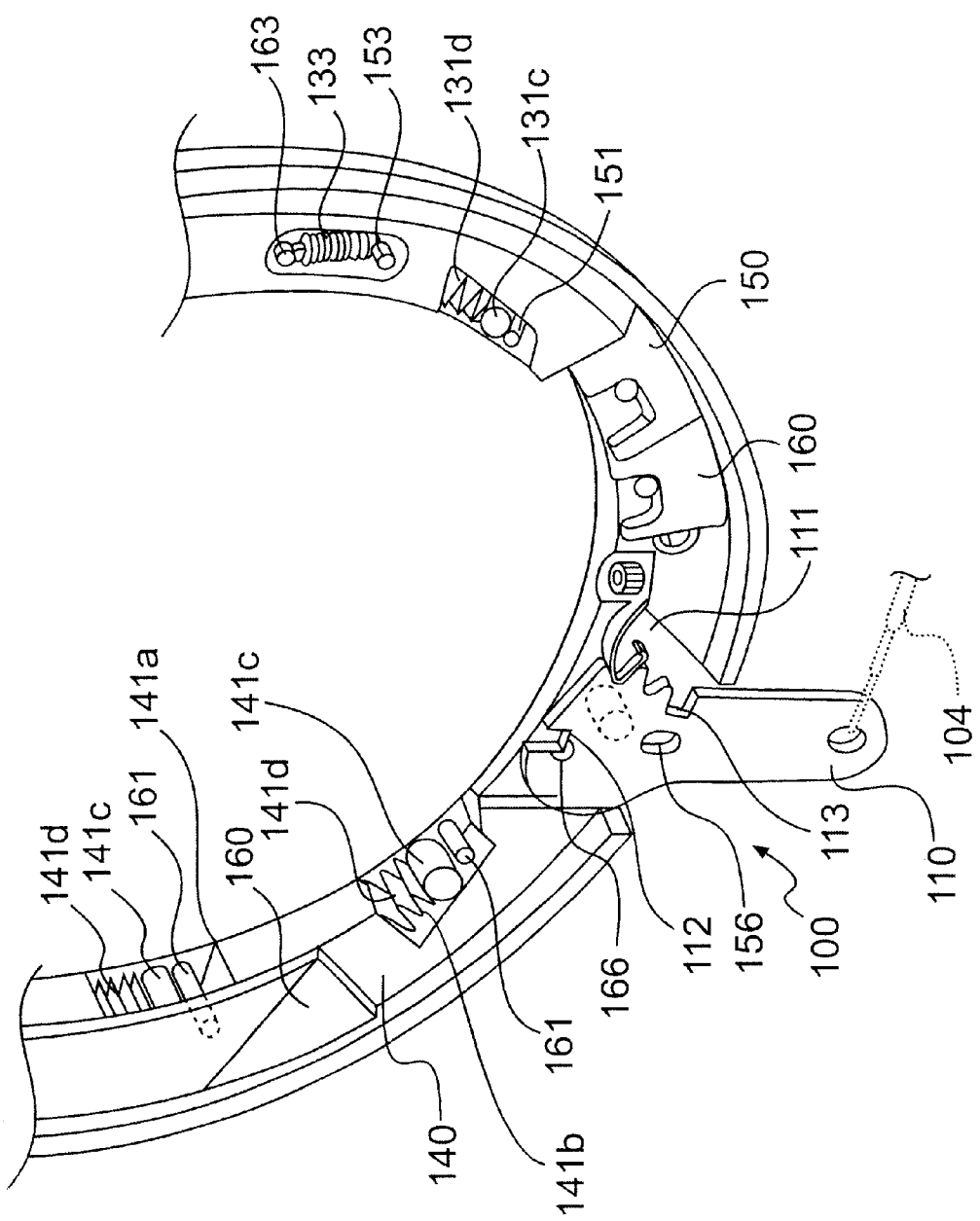
FIG. 8 is a perspective view showing the construction of principal parts of a traveling and accelerating system for bicycles according to the present invention, in which a conversion control part is set to a backward accelerated travel mode.

FIG. 6 to FIG. 8 are perspective views respectively showing principal parts of the traveling and accelerating system for bicycles according to the present invention, in which it is apparent to understand the movement of moving plates for controlling clutches according to the selections of the conversion control part 100.

The bicycle includes a frame 10 forming a frame body of the bicycle, front and rear wheels, which are not shown but provided rotatably to the frame 10, and a boss 21 fixed to mount the pedals 20 under a center of the frame 10 to support rotation of the pedals 20.

The pedals 20 are fixed inside the boss 21 and a shaft 22 is rotatably inserted through the inside of the boss 21 by means of bearings (unshown). Therefore, when a user steps the pedals 20 at both sides of the boss 21, rotational power is transmitted to the shaft 22 so that the rotational power drives a driven sprocket (unshown) at the rear wheel via a chain 31 by means of the driving sprocket 30 which is axially mounted on the shaft 22, thereby the bicycle traveling forward.

The driving sprocket 30 which is axially mounted on the shaft 22 is positioned in a housing 40 to transmit the rotational power via the chain 31.

The housing 40 is fixed on the frame 10 at one side of the boss 21 and closed with a cap 41 at its opening, accommodating various accessories therein, so that external impurities may be prevented from being introduced therein and viscosity of oil which is necessary for operating the accessories may be protected.

The housing 40 accommodates the driving sprocket 30, a pinion 50, a first gear member 60, and a second gear member 70 therein. That is, in the housing 40, the pinion 50 is axially fixed on the shaft 22 at one side of the driving sprocket 30 to rotate together with the driving sprocket 30.

A clutch 80 for preventing reverse-driving is fixedly interposed between the driving sprocket 30 and the pinion 50, thereby rotating together with the driving sprocket 30 and the pinion 50.

When the pedals 20 are rotated in the clockwise direction for forward traveling, the clutch 80 interposed between the driving sprocket 30 and the pinion 50 connect the driving sprocket 30 and the pinion 50 and rotate them with each other. When the pedals 20 are stepped backward, the second gear member 70 is released from the driving sprocket 30 by means of a below-mentioned bearing clutch.

The housing 40 accommodates the first gear member 60 formed with an inner gear part 62.

The inner gears 62 of the first gear member 60 are engaged with planetary gears 74 of the second gear member 70, and the planetary gears 74 are mounted by means of a pin 75 and rotatable with relation to the pin 75 in the housing 40.

The sleek inner peripheral 62 of the first gear member 60 has a peripheral formed without teeth, so that a clutch bearing 91 is inserted on the inner peripheral, the clutching bearing 91 being provided with a plurality of balls 91c and springs 91d in a predetermined interval.

The second gear member 70 is also inserted with a clutch bearing 92 in the same manner as the first gear member 60.

The clutch bearings 91 and 92 are respectively formed with a plurality of grooves 91a and 92a in a predetermined interval and have slanted surfaces 91b and 92b respectively, so that the balls 91c and 92c and the springs 91d and 92d are respectively fitted into the grooves 91a and 92a.

Therefore, when rotation direction of the clutch bearings 91 and 92 is different from that of the first and second gear members 60 and 70, that is, different from that of the slanted surfaces 91b and 92b, the balls 91c and 92c slide along the slanted surfaces 91b and 92b into positions where a distance from the first and second gear members 60 and 70 to the slanted surfaces 91b and 92b becomes narrow.

Then, the balls 91c and 92c are closed in the narrow space between the clutch bearings 91 and 92 and the first and second gear members 60 and 70, so that the clutch bearings 91, 92 and the first and second gear members 60 and 70 become coupled integrally, thereby being controlled to rotate respectively in one direction. Detailed description with regard to the operation of the clutch bearings 91 and 92 is omitted since it has already been widely known in the routine mechanical fields.

Since the slanted surface 91b of the clutch bearing 91 is formed in an opposite direction to the slanted surface 92b of the clutch bearing 92, the first gear member 60 and the second gear member 70 are controlled to rotate in a different direction from each other.

As the pedals 20 are stepped, the first gear member 60 and the second gear member 70 are selectively driven. In this case, the planetary gears 74 control traveling speed of the bicycle, for example, in 1:1 Forward Traveling Mode, Accelerated Traveling Mode or Backward Traveling Mode.

A conversion control part 100 is mounted outside the housing 40 to selectively control the latch member 85 to function in the 1:1 Forward Traveling Mode, Accelerated Traveling Mode or Backward Traveling Mode. The conversion control part 100 controls the traveling by fixing any one or both of the first and second gear, members 60 and 70 not to rotate, or by making them rotate freely.

A lever 110 is positioned through outside and inside of the housing 40 and connected with the release cable 104 which is provided at a convenient position with the user, for example, a position around a handle of the bicycle, so that the user may change a position of the lever 110 by means of the release cable 104, thereby controlling the rotation of the first gear member 60 and the second gear member 70 by means of a forward driving clutch bearing 130 and a backward driving clutch bearing 140.

The forward driving clutch bearing 130 and the backward driving clutch bearing 140 are respectively positioned in the housing 40 and in the cap 41 to perform the 1:1 Forward Traveling Mode, Accelerated Traveling Mode or Backward Traveling Mode by fixing or releasing outer diameters of the first gear member 60 and the second gear member 70.

The lever 110 is connected at its one end part to a conversion selection lever (unshown) and the release cable 104 which is positioned around the handle of the bicycle, so that rotation angle of the lever 110 is converted by a wire which is pulled in response to manipulation of the conversion selection lever.

In this case, the function of the forward driving clutch bearing 130 and the backward driving clutch bearing 140 correspond to that of the above clutch bearings 91 and 92.

The first gear member 60 has the sleek inner peripheral 62 without teeth, so that the clutch bearing 130 is inserted in the inner peripheral 62, the clutch bearing 130 being provided with a plurality of balls 131*c* and springs 131*d* in a predetermined interval.

The second gear member 70 is also inserted on its outer diameter with the clutch bearing 140 in the same manner as the first gear member 60.

The clutch bearings 130 and 140 are respectively formed with a plurality of grooves 131*a* and 141*a* in a predetermined interval and have slanted surfaces 131*b* and 141*b* respectively, so that the balls 131*c* and 141*c* and the springs 131*d* and 141*d* are respectively fitted into the grooves 131*a* and 141*a*.

Therefore, when rotation direction of the clutch bearings 130 and 140 is different from that of the first and second gear members 60 and 70, that is, different from that of the slanted surfaces 131*b* and 141*b*, the balls 131*c* and 141*c* slide along the slanted surfaces 131*b* and 141*b* into positions where a distance from the first and second gear members 60 and 70 to the slanted surfaces 131*b* and 141*b* becomes narrow.

Then, the balls 131*c* and 141*c* are closed in the narrow space between the clutch bearings 130 and 140 and the firsthand second gear members 60 and 70, so that the clutch bearings 130, 140 and the first and second gear members 60 and 70 become coupled integrally, thereby being controlled to rotate respectively in one direction.

The rotation of the first gear member 60 and the second gear member 70 is controlled by clutch pins 151, 161 of moving plates 150, 160 which move in response to position change of the lever 110 and control positions of the balls 131*c*, 141*c*, thereby performing the Forward Traveling Mode, Accelerated Traveling Mode or Backward Traveling Mode.

The lever 110 is elastically mounted by a spring 111 and controlled its position according to manipulation of the user by means of the release cable 104, thereby performing the Forward Traveling Mode, Accelerated Traveling Mode or Backward Traveling Mode.

The clutch pins 151, 161 of the moving plates 150, 160 are protruded toward the balls 131*c*, 141*c*. The moving plates 150, 160 are elastically installed on a hook protrusion 163 to return to initial positions if external force of the spring 133 is not applied, and have protrusions 156, 166 to be inserted to grooves 112, 113 of the rotatably mounted lever 110.

Therefore, as the protrusions 156, 166 moves by the lever 110, the clutch pins 151, 161 controls the positions of the balls 131*c*, 141*c* and the coupling state of the clutch bearings 130, 140 and the first gear member 60 and the second gear member 70 to perform the travel modes.

The groove 112 of the grooves 112 and 113 of the lever 110 controls the protrusion 166 and is wide enough to allow the protrusion 166 to move therein. Accordingly, in case of normal accelerated forward traveling of two-stage dynamics to be described below, the protrusion 166 is released from the groove 112 of the lever 110, and only in case of speed change of triple-stage dynamics for accelerated backward traveling, is controlled by the lever 110.

In order to prevent possible damage caused by inside load of the housing 40, a bracket 140 is provided and a thrust bearing 171 is preferably provided in the contact portions with the housing 40 and the cap 41.

Now, operation by steps will be described in more detail.

(Forward Normal Travel)

Referring to FIG. 3 to FIG. 6, since the lever 110 connected to the release cable 104 is not pulled yet by the manipulation of the user, the lever 110 is in a most slanted position (see FIG. 3) so that the protrusions 156, 166 are separated to both end parts. Therefore, the clutch pins 151, 161 push the balls 131*c*, 141*c* into the deepest position of the slanted surfaces 131*b*, 141*b*.

When the user steps the pedals 20 in the clockwise direction as shown by an arrow in FIG. 3, the clutch bearings 91 and 92 put on a square end portion of the shaft 22 rotate in a same direction, since the clutch bearings 130 and 140 are not engaged with the first and second gear members 60 and 70 by the balls 131*c*, 141*c*.

Since the balls 92*c* are closed between the slanted surfaces 92*b* of the clutch bearing 92 and the second gear member 70 and the balls 91*c* are closed between the opposite slanted surfaces 91*b* of the clutch bearing 91 and the first gear member 60, the clutch bearings 91 and 92 become coupled with the first and the second gear members 60 and 70 integrally, preventing backward rotation of the first gear member 60.

The planetary gears 74 movably mounted to the second gear member 70 are engaged with the inner gear 62 of the first gear member 60, so that it becomes impossible for the planetary gears 74 to rotate.

Therefore, when the pedals 20 are stepped by the user for forward traveling, the latch member 85 which is coupled with the first gear member 60 and the second gear member 70 rotates, so that the planetary gears 74 supported by the pins 75 race and the pinion 50 which is fixed by the driving sprocket 30 rotates in the clockwise direction, being engaged among the planetary gears 74, thereby the driving power being transmitted to the rear wheels via the chain 31.

In this case, the clutch 80 which is rotatably interposed between the driving sprocket 30 and the pinion 50 also rotates in the same direction when the pedals 20 are stepped by the user for forward traveling with the driving sprocket 30 and the second gear member 70 coupled. However, when the user steps the pedals 20 in the opposite direction, the second gear member 70 is released from the driving sprocket 30 by functions of the clutch bearings as described below.

Therefore, if the user stops stepping the pedals 20 or steps the pedals 20 backward, the latch 82 of the latch member 85 rotates in a direction to be released from the latch gear 73 of the second gear member 70, so that the stopping of the rotation of the pedals 20 while traveling the bicycle or backward stepping of the pedals 20 become possible without transmitting the power.

(Accelerated Forward Traveling)

As shown in FIG. 4 and FIG. 7, according to manipulation of the lever positioned around the handle, the lever 110 connected to the release cable 104 becomes positioned in the center of its range of operation.

In this time, if the protrusion 156 of the moving plate 150 which is located toward the clutch bearing 130 is moved by the manipulation of the lever, the clutch pin 151 of the moving plate 150 makes the ball 131c retreat into the deepest position of the slanted surface 131b by elasticity of the spring 131d.

Therefore, the first gear member 60 is fixed by the ball 131c which is forced to be pressed and only the second gear member 70 is rotatable. If the pedals 20 are stepped in the clockwise direction of an arrow of FIG. 5 for forward travel, the clutch bearings 91 and 92 rotate in the same direction.

Since the slanted surface 91b of the clutch bearing 91 is formed in an opposite direction to the slanted surface 92b of the clutch bearing 92, the first gear member 60 is fixed by the forcibly pressed ball 131c, while the second gear member 70 can be freely rotated.

The planetary gears 74 rotatably mounted on pins 75 of the second gear member 70 are engaged with the inner gear 62 of the first gear member 60. When the second gear member 70 rotates, the planetary gears 74 race in response to the rotation of the second gear member 70 since a common center of the planetary gears 74 rotates in the sane direction with the second gear member 70.

Simultaneously, the planetary gears 74 rotate by the inner gear 62 of the first gear member 60, so that the pinion 50 being engaged among the planetary gears 74 obtains a rotation number which is increased by both racing and the rotation of the planetary gears 74.

Therefore, when the pedals 20 are stepped by the user for forward traveling, the clutch 80 interposed between the driving sprocket 30 and the pinion 50 and the clutch bearing 92 which are coupled with the second gear member 70 rotate in the same direction with the second gear member 70, so that the pinion 50 which is coupled with the driving sprocket 30 is accelerated in its rotation by a speed ratio of the planetary gears 74 positioned between the inner gear 62 of the stopped first gear member 60 and the pinion 50, thereby the driving power being transmitted to the rear wheels via the chain 31.

(Accelerated Forward Traveling by Backward Rotation of the Pedals)

As shown in FIG. 5 and FIG. 8, if the lever 110 connected to the release cable 104 is moved to be in most perpendicular position, the protrusion 166 of the moving plate 160 which is controlled by the groove 112 of the lever 110 moves in the opposite direction of the lever 110 and the protrusion 156 of the moving plate 150 moves in the opposite direction of the protrusion 166, such that the protrusions 156 and 166 are arranged perpendicularly. Therefore, the clutch pins 151, 161 of the moving plates 150, 160 move the balls 131c, 141c to the lowest position of the slanted surfaces 131b, 141b by the elastic force of the springs 131d, 141d.

Therefore, the first gear member 60 can be rotated, but the second gear member 70 becomes coupled with the clutch bearing 140. The clutch bearing 92 can be rotated with the second gear member 70.

If the user manipulates the pedals 20 in the counterclockwise direction as shown by an arrow of FIG. 5, the clutch bearings 91, 92 which are connected to the pedals 20 via the shaft 22 also rotate backward.

The balls 91c of the clutch bearing 91 are moved along the slanted surfaces 91b and closed to the first gear member 60, such that the first gear member 60 is controlled in its rotation by the clutch bearing 91. Accordingly, when the pedals 20 are rotated in the counterclockwise direction, only the planetary gears 74 can be rotated on the pins 75 in forward direction so as to transfer the power to the pinion 50.

The driving sprocket 30 geared to the pinion 50 is rotated so as to transfer the rotary power to the rear wheel.

In this case, the balls 92c of the clutch bearing 92 are also moved along the slanted surfaces 92b and closed to the second gear member 70. Therefore, the balls 91c may move toward the deepest position of the slanted surface 91b, and the first gear member 60 is fixed forward and rotatable backward.

On the other hand, the second gear member 70 is fixed backward and rotatable forward by the clutch bearing 92.

In the meantime, the planetary gears 74 movably mounted to the second gear member 70 are engaged with the inner gear 62 of the first gear member 60, so that the planetary gears 74 rotate but not race.

Therefore, when the pedals 20 are stepped by the user for backward traveling, the latch member 85 and the clutch bearing 91 rotate backward being coupled with the first gear member 60, so that the planetary gears 74 supported by the pins 75 rotates and the pinion 50 which is engaged among the planetary gears 74 rotate normally in the forward direction, thereby transmitting the driving power to the rear wheels via the chain 31 in the opposite direction to the rotation of the pedals 20. At this time, the rotation ratio is accelerated.

In the meantime, if the pedals 20 are rotated in the forward normal direction, contrary to the above, by the functions of the clutch bearings 91, 92, 130, and 140, the clutch bearing 140, the second gear member 70, and the clutch bearing 92 can slide with each other, and the first gear member 60 is controlled in its rotation by the clutch bearing 130.

Accordingly, the planetary gears 74 are rotated backward with the inner gear 62 of the first gear member 60 and transfer the accelerated driving power to the pinion 50, thereby the driving sprocket 30 has the accelerated forward normal traveling. In this condition, the bicycle according to the present invention can perform uniformly accelerated forward traveling regardless of direction of the rotation of the pedals 20.

EFFECT OF THE INVENTION

According to the present invention as described hereinabove, if the user simply manipulates the operation lever, the bicycle may run forward regardless of the forward rotation and the backward rotation of the pedals, so that the user may develop their leg-muscles in balance without feeling as bored and tired as riding the prior art bicycle, as well as accelerate the running speed selectively. additional change gear is not necessary any more and the users may obtain a bicycle at a relatively low cost Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A traveling and accelerating system for bicycles comprising:

a frame having a front wheel at a front part and a rear wheel at a rear part thereof;

a pair of pedals fixed at both sides of a shaft which is rotatably supported at a boss being fixed under a center of the frame, to be driven by a user's feet;

a driving sprocket axially fixed on the shaft for transmitting rotation power via a chain to the rear wheel;

a housing attached at one side of the boss to be closed with a cap and having a hollow cross-sectional shape to accommodate accessories;

a pinion axially fixed on the shaft beside the driving sprocket in the housing;

a first gear member accommodated in the housing and having an inner gear part along its inner diameter;

a second gear member movably contacting the first gear member and provided with planetary gears to be engaged with the inner gear part of the first gear, the planetary gears being fixed by pins and rotatable in relation to the pins;

a pair of latch means respectively inserted and fixed in the first gear member and the second gear member by being penetrated with a shaft of the pedals so as to rotate the gear members respectively in one direction; and a conversion control part connected to a release cable outside the housing for setting a travel mode or an acceleration mode corresponding to rotation directions of the pedals by controlling engagement of the first gear member and the second gear member according to the user's selection.

2. The traveling and accelerating system for bicycles according to claim 1, wherein the latch means comprises a plurality of grooves formed in a predetermined interval and the grooves have slanted surfaces in different directions, so that a pair of clutch bearings having balls and springs is assembled in inner diameters of the first and second gear members.

3. The traveling and accelerating system for bicycles according to claim 1, wherein the conversion control part includes clutch bearings to be coupled to the first gear member and the second gear member for controlling them when the first and second gear members rotate in opposite directions, and the clutch bearings control the rotations of the first gear member and the second gear member according to positions of clutch pins of moving plates selected by the user for changing gears.

4. The traveling and accelerating system for bicycles according to claim 3, wherein the lever of the conversion control part is elastically mounted by a spring and controlled in its position according to manipulation of a user by means of the release cable in such a manner that protrusions on the moving plates become inserted into grooves in the lever.

5. The traveling and accelerating system for bicycles according to claim 3, wherein the clutch bearings are formed with a plurality of slanted grooves to accommodate balls and springs.

6. The traveling and accelerating system for bicycles according to claim 1, wherein each of the pair of latch means is penetrated by the shaft in the center of the respective gear member.

7. The traveling and accelerating system for bicycles according to claim 6, wherein a first one of the latch means is installed inside a cylindrical ring on one side of the first gear member adjacent to the inner gear of the first gear member, and a second one of the latch means is installed in an inner cylindrical hole of the second gear member to rotate in reverse to said first one of the latch means, such that the first and second gear members rotate in one direction by operation of the pedals in both forward and backward directions.

* * * * *